(12) United States Patent
Joch

(10) Patent No.: US 6,586,899 B2
(45) Date of Patent: Jul. 1, 2003

(54) METHOD AND CIRCUIT ARRANGEMENT FOR SWITCHING ON A POWER OUTPUT STAGE

(75) Inventor: Christoph Joch, Schwalbach (DE)

(73) Assignee: Mannesmann VDO AG, Frankfurt (DE)

( * ) Notice: Subject to any disclaimer, the term of this patent is extended or adjusted under 35 U.S.C. 154(b) by 0 days.

(21) Appl. No.: 09/734,327

(22) Filed: Dec. 1, 2000

(65) Prior Publication Data

US 2001/0020836 A1 Sep. 13, 2001

(30) Foreign Application Priority Data

Dec. 6, 1999 (DE) .......................... 199 58 724
Nov. 16, 2000 (DE) .......................... 100 57 156

(51) Int. Cl.[7] .............................. H02K 17/32
(52) U.S. Cl. .................. 318/434; 318/254; 318/432; 318/439; 318/599; 361/87; 361/93.1
(58) Field of Search ................ 318/432, 434, 318/599, 439, 254; 323/274, 284; 361/87, 93.1, 93.9

(56) References Cited

U.S. PATENT DOCUMENTS

| | | | |
|---|---|---|---|
| 3,231,809 A | | 1/1966 | Greer |
| 4,456,865 A | * | 6/1984 | Robertson, Jr. et al. .... 318/599 |
| 5,923,135 A | * | 7/1999 | Takeda ........................ 318/432 |
| 5,962,996 A | * | 10/1999 | Goto et al. ...................... 318/4 |
| 6,194,865 B1 | * | 2/2001 | Mitsui et al. ............... 318/811 |
| 6,330,140 B1 | * | 12/2001 | Wilson-Jones et al. ....... 361/87 |

FOREIGN PATENT DOCUMENTS

DE        2435504        2/1976

* cited by examiner

Primary Examiner—Robert E. Nappi
Assistant Examiner—Tyrone Smith
(74) Attorney, Agent, or Firm—Martin A. Farber

(57) ABSTRACT

In a circuit arrangement for switching on a power output stage, in particular for electric motors with a high current draw, the output stage and at least one buffer capacitor connected in parallel with it are connected to an operating voltage source via a relay. A current source which supplies a limited current is connected to the at least one capacitor, bypassing the relay. A delay device is provided, which does not switch on the relay until the at least one capacitor is charged to approximately the operating voltage by the current source.

17 Claims, 1 Drawing Sheet

METHOD AND CIRCUIT ARRANGEMENT FOR SWITCHING ON A POWER OUTPUT STAGE

FIELD AND BACKGROUND OF THE INVENTION

The invention relates to a method for switching on a power output stage, in particular for electric motors having a high current draw, and to a circuit arrangement for carrying out the method.

Motor vehicles increasingly use electric motors which draw a very high current on starting, braking or when changing direction. Such electric motors are used, for example, for window winders or to provide valve travel in the internal combustion engine. In order to ensure a constant supply voltage for the output stage when such high current peaks occur, which may be, for example, approximately 100 A, the output stage can be buffered, generally by a number of electrolytic capacitors, which have a high capacitance of, for example, 3000 µF and a very low internal resistance of a few milliohms. A relay which is used to switch the output stage on and off is loaded with a very high current pulse, for example 200 A, on switching on owing to the extremely low internal resistance of the capacitors. This severe load on the relay necessitates an appropriate design, even though it can be designed for lower currents for actual operation.

SUMMARY OF THE INVENTION

The object of the present invention is to specify a method and a circuit arrangement by means of which such high current pulses on switching on can be avoided, so that it is possible to use a relay designed for lower currents.

According to the invention, the object is achieved in that at least one capacitor, which is provided for buffering the power output stage, is first of all initially charged with a limited current, and is then charged to approximately the operating voltage of the power output stage.

The invention has the advantage that the initial charging of the capacitor prevents damaging inrush currents from flowing. The operating voltage is not applied until the voltage across the capacitor reaches a level at which damaging inrush currents no longer flow.

The change from the initial charging phase to the operating voltage can in this case be carried out in various ways.

In one refinement, the at least one capacitor is charged with the limited current in a predetermined time.

As an alternative to this, the at least one capacitor is initially charged with the limited current until the voltage across the capacitor reaches a predetermined value.

In another development of the invention, the at least one capacitor is charged until the difference between the operating voltage and the voltage across the at least one capacitor falls below a predetermined value.

Advantageously, once the limited current has been switched off, a change is made to the full operating voltage of the power output stage.

In the circuit arrangement according to the invention, the object is achieved in that the output stage and at least one buffer capacitor connected in parallel with it are connected via a relay to an operating voltage source, in that a current source which supplies a limited current is connected to the at least one capacitor, bypassing the relay, and in that a delay device is provided which does not switch the relay on until the at least one capacitor has been charged approximately to the operating voltage by means of the current source.

The circuit arrangement according to the invention avoids the need to use an expensive high-load relay and in the process reduces the formation of sparks on switching on, reduces the load on the relay contacts, and thus lengthens the life of the relay. A further advantage of the circuit arrangement according to the invention is that it avoids the electromagnetic interference associated with high current pulses.

The electronic complexity to reduce the circuit arrangement according to the invention is extremely low, particularly if the current source and the relay can be controlled by a controller. A controller which is required in any case to control the output stage can frequently be used for this purpose. However, this does not preclude the delay device being produced using conventional circuit technology. The circuit arrangement according to the invention, which is generally installed in the same housing as the output stage and the capacitors, requires no additional complexity whatsoever, such as wiring or plug connectors.

In one advantageous refinement of the invention, the relay is switched on at a predetermined time after the current source has been switched on. This can be achieved particularly easily and leads to a considerable reduction in the inrush current pulse.

In detail, and depending on the Circumstances, it may also be possible to use another advantageous refinement in which the relay is not switched on until the voltage across the at least one capacitor reaches a predetermined value.

An even greater reduction in the inrush current pulse can be achieved with a further refinement, in which the relay is not switched on until the difference between the operating voltage and the voltage across the at least one capacitor falls below a predetermined value.

BRIEF DESCRIPTION OF THE DRAWINGS

The invention allows numerous embodiments. Three of these are described in the following text and are illustrated schematically by a number of figures in the drawing, in which.

DETAILED DESCRIPTION OF THE PREFERRED EMBODIMENT

Identical parts are provided with the same reference symbols in the figures.

Figure 1:
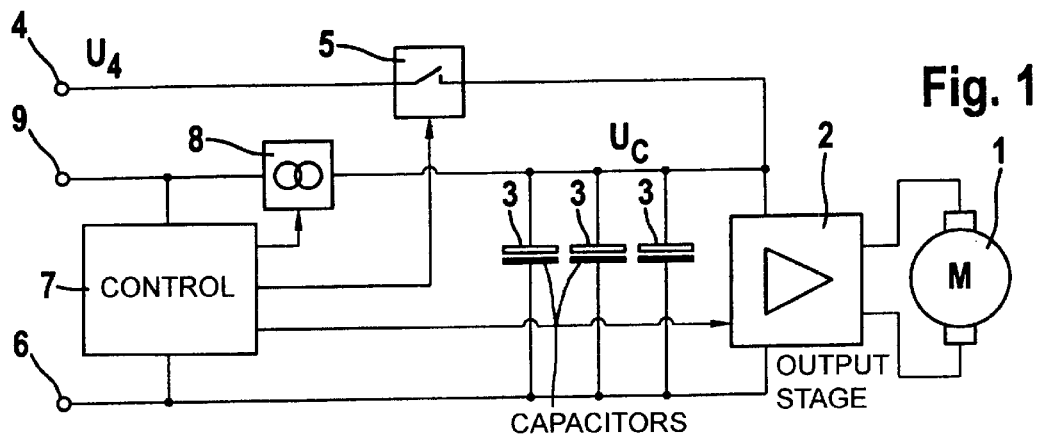
FIG. 1 shows a first exemplary embodiment.
Figure 2:
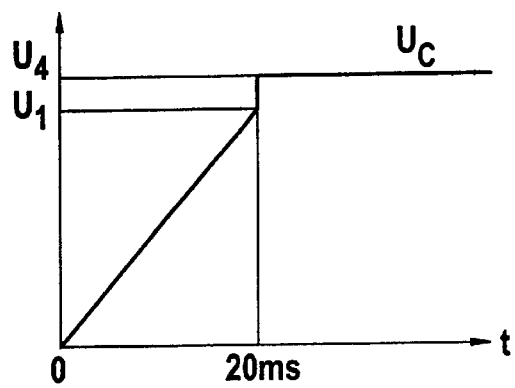
FIG. 2 shows the profile of the capacitor voltage on switching on, FIG. 3 shows a second exemplary embodiment
Figure 3:
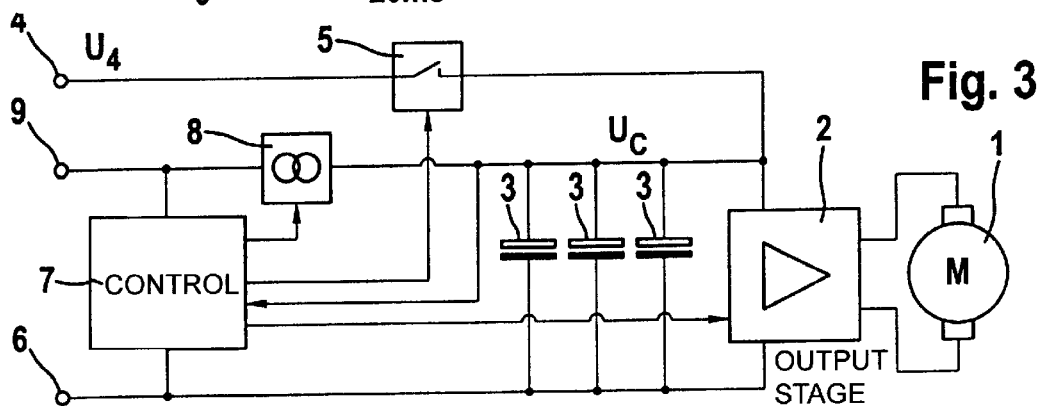
Figure 4:
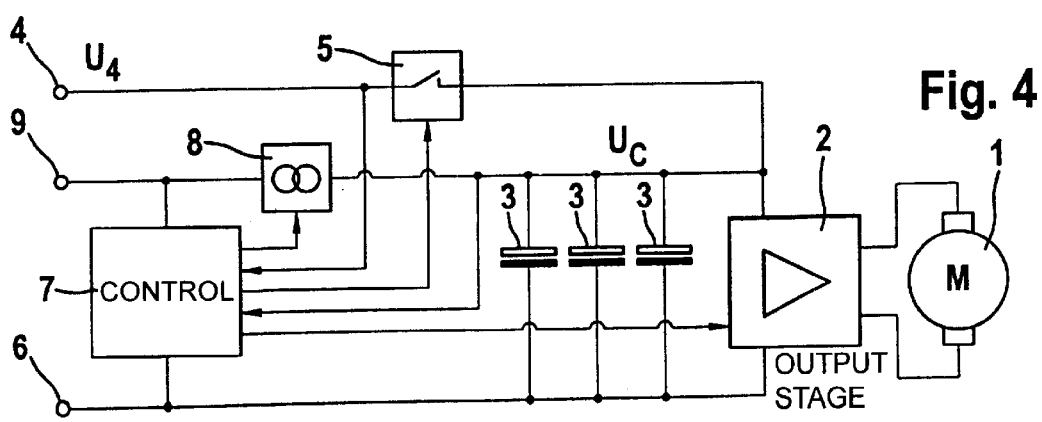
FIG. 4 shows a third exemplary embodiment.

In the exemplary embodiments illustrated in FIGS. 1, 3 and 4, a motor 1 is supplied from an output stage 2 with currents which are generally pulse-width modulated, for which purpose the output stage 2 is driven by a controller 7. The controller 7 is in this case in the form of control electronics at the output stage 2. Owing to the high current draw during starting of the motor 1, as mentioned initially, the operating voltage of the output stage 2 is buffered by electrolytic capacitors 3. The output stage 2 and the electrolytic capacitors 3 are connected to the operating voltage via a relay 5 and via a connection 4. The other connection 6 for the operating voltage is generally connected to ground in the motor vehicle, On switching on the circuit arrangement, the operating voltage is first of all applied via a connection 9 to the controller 7, which drives the current source 8 in such a way that the capacitors 3 are charged with a limited current from the supply to the controller 7. In the exemplary embodiment shown in FIG. 1, once a predetermined time of, for example, 20 ms has passed (FIG. 2), the controller 7 switches off the current source 8 and switches on the relay 5, so that the capacitor is suddenly charged to the operating voltage $U_4$ supplied at 4. The current pulse which occurs in the process is, however, considerably less than when switching on the uncharged capacitors 3, namely in the ratio $(U_4-U_1)/U_4$.

In the exemplary embodiment shown in FIG. 3, the voltage $U_c$ applied to the capacitor is supplied to one input of the controller 7, which switches on the relay 5 depending on whether the voltage $U_c$ has fallen below a predetermined value, rather than as a function of time.

FIG. 4 shows an exemplary embodiment in which the relay 5 is not switched on using the absolute value of the voltage $U_c$, but by forming the difference between the voltages $U_4$ and $U_c$ for this purpose. When this difference is small enough, the relay 5 is switched on.

It is advantageous to design the current source 8 such that it can be controlled by an open or closed loop, in order to prevent the entire current from flowing via the control electronics supply, if the power supply were not connected, since this would destroy said control electronics supply,

I claim:

1. A method for switching on a power stage connectable to a load, the power stage being suitable for driving an electric motor with a high current draw, the method comprising the steps of:
   connecting at least one capacitor across input terminals of the power stage, initially changing the capacitor with a limited current to attain a capacitor voltage less than an operating voltage of the power stage required for operating the load, and then switching on a larger voltage to the capacitor for charging the capacitor to approximately the operating voltage of the power stage.

2. The method as claimed in claim 1, wherein said one capacitor is initially charged with the limited current in a predetermined time.

3. The method as claimed in claim 1, wherein said one capacitor is initially charged with the limited current until the voltage across said one capacitor reaches a predetermined value.

4. The method as claimed in claim 1, wherein said one capacitor is initially charged until the difference between the operating voltage and the voltage across said one capacitor falls below a predetermined value.

5. A circuit arrangement for switching on a power stage connectable to a load, in particular for electric motors with a high current draw, comprising the power stage and at least one buffer capacitor connected across input terminals of the power stage, a relay connecting a terminal of the capacitor to an operating voltage source providing sufficient voltage for operation of the load, a current source which supplies a limited current to said one capacitor to charge said capacitor to a first voltage less than said operating voltage, and a delay device which switches the relay on after said one capacitor has been charged to said first voltage.

6. The circuit arrangement as claimed in claim 5, wherein the delay device is a controller which controls the current source and the relay.

7. The circuit arrangement as claimed in claim 6, wherein the relay is switched on by the controller at a predetermined time after the current source has been switched on by the controller.

8. The circuit arrangement as claimed in claim 5, wherein the relay is not switched on until the voltage across said one capacitor reaches a predetermined value.

9. The circuit arrangement as claimed in claim 5, wherein the relay is not switched on until the difference between the operating voltage and the voltage across said one capacitor falls below a predetermined value.

10. A method for switching electric power into a power stage connectable to a load, the power output stage being capable of applying current to an electric motor, the method comprising steps of:
    employing a circuit having a first branch and a second branch for applying power to input terminals of the power stage, the circuit including a capacitor connected across input terminals of the power stage;
    connecting the first branch and the second branch to the input terminals of the power stage, the first branch having a current source and the second branch having a switch;
    operating the current source of the first branch to charge the capacitor to an initial amount of voltage; and
    after attaining the initial voltage, terminating the current of the current source and operating the switch to connect a voltage source via the second branch to the output stage, voltage of the voltage source being sufficient to drive the load via the power stage and being greater than the initial voltage.

11. A method according to claim 10, wherein the initial voltage is attained by charging the capacitor for a predetermined time, whereupon the current source is deactivated.

12. A method according to claim 10, wherein charging of the capacitor continues until the initial voltage reaches a predetermined value, whereupon the current source is deactivated.

13. A method according to claim 10, wherein the charging of the capacitor continues until a difference between the source voltage and the initial voltage drops to a predetermined value, whereupon the current source is deactivated.

14. A circuit for switching electric power into a power stage connectable to a load, the power stage being capable of applying current to an electric motor, the circuit comprising:
    a power applying circuit having a first branch, a second branch and a capacitor, the capacitor being connected across input terminals of the power stage, and each of the first branch and the second branch being connected to an input terminal of the power stage;
    a current source in the first branch and a switch in the second branch; and
    a controller f or operating the current source to charge the capacitor to an initial value of voltage less than that required for driving the load via the power stage, wherein, subsequent to attainment of the initial value of voltage, the controller operates the switch to connect a source of voltage to the power stage, the source voltage being sufficient for the driving of the load and being greater than the initial voltage.

15. A circuit according to claim 14, wherein the initial voltage is attained by charging the capacitor for a predetermined time.

16. A circuit according to claim 14, wherein charging of the capacitor continues until the initial voltage reaches a predetermined value.

17. A circuit according to claim 14, wherein the charging of the capacitor continues until a difference between the source voltage and the initial voltage drops to a predetermined value, whereupon the current source is deactivated.

* * * * *